May 22, 1923.
R. W. A. BREWER
1,456,176
FUEL MANIFOLD
Filed June 23, 1921
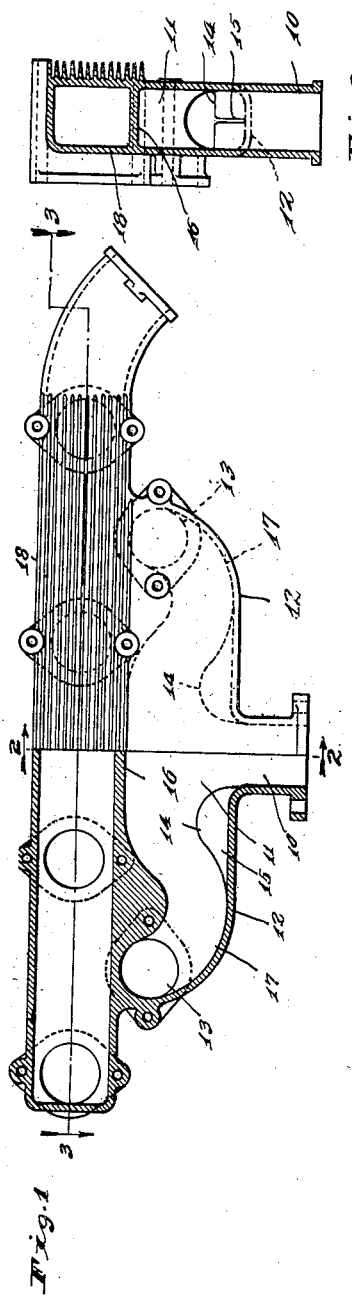
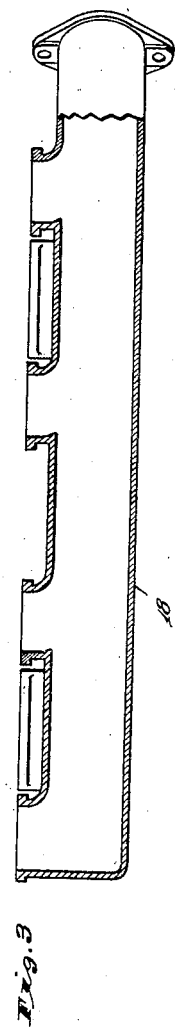
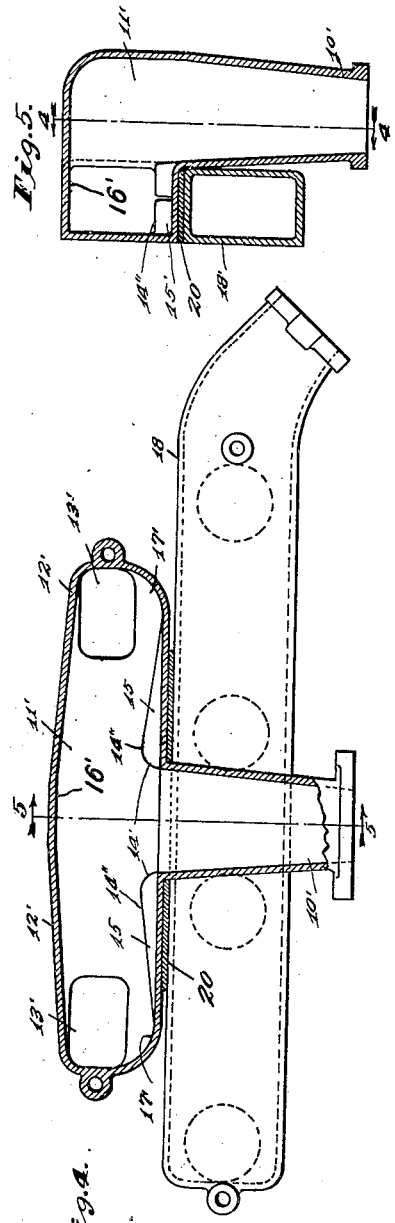
Inventor
ROBERT W. A. BREWER,
By Hood & Schley
Attorneys Patented May 22, 1923.

1,456,176

UNITED STATES PATENT OFFICE.

ROBERT W. A. BREWER, OF INDIANAPOLIS, INDIANA.

FUEL MANIFOLD.

Application filed June 23, 1921. Serial No. 479,887.

(GRANTED UNDER THE PROVISIONS OF THE ACT OF MARCH 3, 1921, 41 STAT. L., 1313.)

*To all whom it may concern:*

Be it known that I, ROBERT W. A. BREWER, a subject of the King of Great Britain, having declared my intention of becoming a citizen of the United States, residing at Indianapolis, in the county of Marion and State of Indiana, have invented a new and useful Fuel Manifold (for which I filed an application in Great Britain Dec. 1, 1913, Patent No. 27681, of 1913), of which the following is a specification.

This invention relates to improved means for connecting a carburetor to the several cylinders of a multi-cylinder internal combustion engine.

Prior to my present invention, it was common practice to connect the carburetor with the several cylinders by means of a pipe connected to a manifold, generally of either T or Y form, the various passages of the manifold being substantially uniform in cross section from the carburetor to the several cylinders.

Where a manifold of the T-shape was used, it was found that there would be, during the operation of the engine, a precipitation of liquid particles from the fuel stream, said particles either running or being driven back into the carburetor through the stem of the T. The Y-shaped manifold was designed to provide means by which the fuel stream could be conducted to the several cylinders without sudden changes of the direction of flow and thereby avoid, to some extent at least, the precipitation of the liquid particles from the fuel stream. With such construction especially where the engine is designed for high speeds, the valve timing is of such character that at low engine speeds each piston actually produces a reverse flow of fuel mixture in the adjacent portion of the manifold and, at certain critical speeds, actually causes ejection of fuel mixture backwardly through the carburetor. As the speed increases, the inertia of the fuel mixture in the various branches of the manifold may, when high speeds are reached, serve to prevent actual ejection of fuel mixture backwardly through the carburetor but in any event pulsations are set up in the manifold and these pulsations are of such character as to seriously affect the functioning of the carburetor.

An object of my invention is to so form the manifold that the fuel stream, as it issues from the carburetor, is subjected in the manifold to a sudden change of direction of flow so that any liquid particles entrapped therein will be precipitated, and to then provide means by which the precipitate may be promptly highly heated to such an extent as to insure volatilization of the major portion of the precipitate without, however, heating the gaseous portion of the mixture to an undesirable extent.

A further object of my invention is to so form the manifold that at the junction between its short main stem and its branches there will be a sufficient capacity to form what might be termed an expansion chamber or, rather, a damping chamber, and to so arrange the branching arms of the manifold relative to this damping chamber and the main stem of the manifold that pulsations, started at the ends of the branches of the manifold by the reverse action of the pistons or otherwise will serve to assist the flow of fuel to the next cylinder of the series through the oppositely directed branch of the manifold, instead of acting to retard or reverse flow of fuel mixture in the stem of the manifold.

A further object of my invention is to provide means by which the quantity of heat, furnished to the surface upon which the precipitate may lie, may be varied readily so as to give the most efficient effect, this effect being produced by providing means by which the metallic contact existing between the heating medium, as for instance, the exhaust pipe, and that portion of the damping chamber upon which the precipitate may be treated, may be readily varied and localized. With fuels such as are now commonly used, and such as were common, although to a lesser extent, in 1913, the locally heated surfaces, to which further attention will be called, should be heated to at least 150° centigrade, the temperature being determined by the minimum temperature which is required to volatilize the least volatile component of the liquid fuel being used.

The accompanying drawings illustrate my invention. Fig. 1 is an elevation in partial vertical section of one embodiment of my invention; Fig. 2 a vertical section on line 2—2 of Fig. 1; Fig. 3 a horizontal section on line 3—3 of Fig. 1; Fig. 4 a vertical section, on line 4—4, of Fig. 5, of another embodiment of my invention and Fig. 5 a section on line 5—5 of Fig. 4.

In Figs. 1, 2 and 3 of the drawings, 10 indicates the stem or receiving passage of the manifold adapted to be directly connected to any suitable carburetor (not shown) so that there may be unimpeded flow directly from the carburetor into and through stem 10. The stem 10 of the manifold leads into what I have termed the damping chamber 11 which delivers into the branches 12. 12 of the manifold, each of said branches delivering at 13 to one or more cylinders of the engine. The branches 12, 12 in this form conjoin with the damping chamber at an acute angle to the axis of stem 10, this being accomplished by what might be termed humps 14, 14 in the angle between stem 10 and each branch 12, each of these humps being medially traversed by a small drainage groove 15, the purpose of which will appear. The surface 16 which forms one wall of the damping chamber 11, extends laterally across the axis of passage 10 so that the incoming fuel mixture impinges squarely upon this surface, the direction of the flow of the fuel mixture being thereby suddenly changed, and this sudden change of the direction of the flow causes precipitation of the liquid particles from the stream upon the surface, said liquid particles thereafter dragging along the upper wall of each passage 12 and, in case of excessive precipitation, finally accumulating in a puddle pocket 17 at a low point in each branch 12. The drainage groove 15 communicates with this puddle pocket and permits a retarded drainage of any accumulation back to the main passage 10 where it will be caught up by the incoming fuel mixture and returned to the surface 16.

In order to highly locally heat the surface 16, I associate it, in the form shown in the figures of the drawing under discussion, with the exhaust pipe 18, the arrangement being such that the quantity of heat which shall be delivered to the manifold will be sufficient to currently heat the precipitate to a temperature sufficient to secure substantial volatilization, but will, nevertheless, be insufficient to substantially heat the fuel mixture as a whole. It will be noted in this connection that the major portions of the exterior of the walls of branches 12 will be cooled by the atmosphere so that these passages will be at a lower temperature than the portion of the manifold which is formed at the junction of the main stem and branches 12.

Referring now to Figures 4 and 5, it will be noted that the main passage 10' is increased in cross-section as it approaches the junction 11' and that the branches 12' are considerably greater in cross section than the delivery orifice 13' which delivers to the cylinders, so that in this form the damping chamber 11' might be said to also include the large-capacity of the branches 12'. The humps 14', with the intermediate drainage passage 15', are similar to corresponding parts in the other form. In this form, the incoming fuel mixture impacts upon the surface 16' and is carried laterally because the branches 12' are in a different plane from the main passage 10' (see Fig. 5) and consequently, because of reduced velocity of the air stream, due to the large cross section of branches 12', there is a greater tendency toward gravity precipitation of the liquid particles upon the upper surface 14'' of the hump 14', excess liquid accumulating in the puddle pocket 17'.

It is for this reason that, instead of locally heating the surface 16', I locally heat the humps 14' by means of metal shims or inserts 20 inserted between the lower wall of the manifold immediately surrounding the passage 10' at its junction with chamber 11'; and the exhaust manifold 18'. By varying the areas of these shims 20, or by varying the material of which the shims are formed, the amount of heat which will be conducted from the walls of the exhaust manifold to the humps 14' may be accurately gauged and proportioned to deliver an appropriate quantity of heat to attain the maximum result.

It will be noted that in each form of the invention which is illustrated in the drawings, the axes of the branches 12, 12 or 12', 12' lie at an acute angle to the axis of the primary inlet passage 10 or 10' and any reversing impulse which may be exerted upon the fuel mixture in one branch will act to facilitate flow through the other branch, and consequently, flow inwardly in the main stem, rather than to retard or reverse flow inwardly in the main stem, and consequently the possibility of the fuel being blown out through the main stem 10 at certain critical speeds is obviated.

The drainage passage is so comparatively small that the gas flow is not materially effected by its presence and it is is provided primarily for the purpose of permitting drainage of the puddle pockets after the engine has ceased running, rather than to provide substantial flow of any accumulation in the puddle pockets during the normal operation of the engine.

I claim as my invention:—

1. A fuel induction pipe for multi-cylinder internal combustion engines, substantially T-shape in form, and means for locally heating a limited portion of the wall of such structure closely adjacent the junction between the main stem and branches, said heated portion being a surface upon which liquid particles from the fuel stream will contact, and the local heating means comprising movable conduction elements.

2. A fuel induction pipe for multi-cylinder internal combustion engines, substantially T-shape in form with the branches at acute angles to the axis of the stem, and means for locally heating a limited portion of the wall of such structure closely adjacent the junction between the main stem and branches, said heated portion being a surface upon which liquid particles from the fuel stream will contact.

3. A fuel induction pipe for multi-cylinder internal combustion engines, substantially T-shape in form, and means for locally heating a limited portion of the wall of such structure closely adjacent the junction between the main stem and branches, said means comprising removable heat conducting elements forming heat conducting connections between an exhaust manifold and the wall to be heated, said heated portion being a surface upon which liquid particles from the fuel stream will contact.

4. A fuel induction pipe for multi-cylinder internal combustion engines, substantially T-shape in form with the branches at acute angles to the axis of the stem, and means for locally heating a limited portion of the wall of such structure closely adjacent the junction between the main stem and branches, said means comprising removable heat conducting elements forming heat conducting connections between an exhaust manifold and the wall to be heated, said heated portion being a surface upon which liquid particles from the fuel stream will contact.

5. A fuel induction pipe for internal combustion engines, substantially T-shape in form, the average cross-sectional dimensions of the interior adjacent the junction between the stem and branches being substantially greater than a cross-sectional dimension of the branch so as to form a damping chamber at the junction between the main stem and branches, and means to locally highly heat a portion of the wall of the damping chamber upon which fuel particles from the fuel stream may contact.

6. A fuel induction pipe for internal combustion engines, substantially T-shape in form, the average cross-sectional dimensions of the interior adjacent the junction between the stem and branches being substantially greater than a cross-sectional dimension of the branch so as to form a damping chamber at the junction between the main stem and branches, and means to locally highly heat a portion of the wall of the damping chamber upon which fuel particles from the fuel stream may contact, said means comprising removable heat conducting elements forming heat conducting connections between an exhaust manifold and the wall to be heated.

7. A fuel induction pipe for internal combustion engines, substantially T-shape in form, the average cross-sectional dimensions of the interior adjacent the junction between the stem and branches being substantially greater than a cross-section dimension of the branch so as to form a damping chamber at the junction between the main stem and branches, the axes of the branches lying at acute angles to the axis of the main stem, and means to locally highly heat a portion of the wall of the damping chamber upon which fuel particles from the fuel stream may contact.

8. A fuel induction pipe for internal combustion engines, substantially T-shape in form, the average cross-sectional dimensions of the interior adjacent the junction between the stem and branches being substantially greater than a cross-sectional dimension of the branch so as to form a damping chamber at the junction between the main stem and branches, the axes of the branches lying at acute angles to the axis of the main stem, and means to locally highly heat a portion of the wall of the damping chamber upon which fuel particles from the fuel stream may contact, said means comprising removable heat conducting elements forming heat conducting connections between an exhaust manifold and the wall to be heated.

9. An induction pipe for internal combustion engines substantially T-shape and formed so as to provide a damping chamber at the junction between the main stem and branches, the branches having puddle pockets intermediate their lengths, and means to locally highly heat a limited area of a wall of the damping chamber upon which liquid fuel particles may contact.

10. An induction pipe for internal combustion engines substantially T-shape and formed so as to provide a damping chamber at the junction between the main stem and branches, the branches having puddle pockets intermediate their lengths and being at acute angles to the axis of the main stem, and means to locally highly heat a limited area of a wall of the damping chamber upon which liquid fuel particles may contact.

11. An induction pipe for internal combustion engines substantially T-shape and formed so as to provide a damping chamber at the junction between the main stem and branches, the branches having puddle pockets intermediate their lengths, and means to locally highly heat a limited area of a wall of the damping chamber upon which liquid fuel particles may contact, said means comprising removable heat conducting elements forming heat conducting connections between an exhaust manifold and the wall to be heated.

12. An induction pipe for internal combustion engines substantially T-shape and formed so as to provide a damping chamber at the junction between the main stem and branches, the branches having puddle pockets intermediate their lengths and being at acute angles to the axis of the main stem, and means to locally highly heat a limited area of wall of the damping chamber upon which liquid fuel particles may contact, said means comprising removable heat conducting elements forming heat conducting connections between an exhaust manifold and the wall to be heated.

13. An induction pipe for internal combustion engines substantially T-shape and formed so as to provide a damping chamber at the junction between the main stem and branches, the branches having puddle pockets intermediate their lengths and being at acute angles to the axis of the main stem, a comparatively small drainage passage forming an outlet from each puddle pocket to the main stem, and means to locally highly heat a limited area of a wall of the damping chamber upon which liquid fuel particles may contact, said means comprising removable heat conducting elements forming heat conducting connections between an exhaust manifold and the wall to be heated.

14. A fuel induction pipe for internal combustion engines comprising a short main stem adapted for direct and close connection with a carburetor, and a branch leading therefrom at an acute angle so as to provide a surface, at the junction upon which the incoming gases will impinge to cause precipitation of liquid particles entrapped in the fuel stream, and means by which may be highly heated a limited portion of the wall closely adjacent the junction and upon which said liquid particles may contact.

15. A fuel induction pipe for internal combustion engines comprising a short main stem adapted for direct and close connection with a carburetor, and a branch leading therefrom at a substantial angle so as to provide a surface at the junction upon which the incoming gases will impinge to cause precipitation of liquid particles entrapped in the fuel stream, and means by which may be highly heated a limited portion of the wall closely adjacent the junction and upon which said liquid particles may contact, said means comprising removable conduction elements adjacent said limited portion of the wall.

16. A fuel induction manifold for multicylinder internal combustion engines formed to provide a wall upon which liquid particles in the fuel-mixture stream will impinge, and means for heating said wall locally, comprising an adjacent exhaust-heated chamber, and removable heat conducting elements inserted between the wall of said heated chamber and a portion of the wall of the manifold to be locally heated.

17. A fuel induction manifold for multicylinder internal combustion engines formed to provide a wall upon which liquid particles in the fuel-mixture stream will impinge, and means for heating said wall locally, comprising an adjacent heated chamber, and removable heat conducting elements inserted between the wall of said heated chamber and a portion of the wall of the manifold to be locally heated.

In witness whereof, I, ROBERT W. A. BREWER, have hereunto set my hand.

ROBERT W. A. BREWER.